US009552535B2

(12) United States Patent
Movellan et al.

(10) Patent No.: US 9,552,535 B2
(45) Date of Patent: Jan. 24, 2017

(54) DATA ACQUISITION FOR MACHINE PERCEPTION SYSTEMS

(71) Applicant: Emotient, Inc., San Diego, CA (US)

(72) Inventors: Javier Movellan, La Jolla, CA (US); Marian Stewart Bartlett, San Diego, CA (US); Ian Fasel, San Diego, CA (US); Gwen Ford Littlewort, Solana Beach, CA (US); Joshua Susskind, La Jolla, CA (US); Jacob Whitehill, Cambridge, CA (US)

(73) Assignee: Emotient, Inc., San Diego, CA (US)

( * ) Notice: Subject to any disclaimer, the term of this patent is extended or adjusted under 35 U.S.C. 154(b) by 227 days.

(21) Appl. No.: 14/178,208

(22) Filed: Feb. 11, 2014

(65) Prior Publication Data

US 2014/0314284 A1 Oct. 23, 2014

Related U.S. Application Data

(60) Provisional application No. 61/763,431, filed on Feb. 11, 2013.

(51) Int. Cl.
*G06K 9/62* (2006.01)
*G06K 9/00* (2006.01)

(52) U.S. Cl.
CPC ......... *G06K 9/6262* (2013.01); *G06K 9/00308* (2013.01)

(58) Field of Classification Search
CPC .................................. G06K 9/00302–9/00315
See application file for complete search history.

(56) References Cited

U.S. PATENT DOCUMENTS

| 8,219,438 | B1 | 7/2012 | Moon et al. | |
| 8,532,344 | B2* | 9/2013 | Connell | G06T 11/00 382/118 |
| 2009/0285456 | A1 | 11/2009 | Moon et al. | |
| 2009/0299824 | A1 | 12/2009 | Barnes, Jr. | |
| 2012/0182447 | A1 | 7/2012 | Gabay | |
| 2013/0101199 | A1* | 4/2013 | Alexandrov | G06K 9/0014 382/133 |
| 2013/0337421 | A1* | 12/2013 | Gerken, III | G09B 5/00 434/236 |
| 2014/0063236 | A1* | 3/2014 | Shreve | G06K 9/00228 348/143 |

* cited by examiner

*Primary Examiner* — Brian P Werner
(74) *Attorney, Agent, or Firm* — Blank Rome LLP

(57) ABSTRACT

Apparatus, methods, and articles of manufacture for obtaining examples that break a visual expression classifier at user devices such as tablets, smartphones, personal computers, and cameras. The examples are sent from the user devices to a server. The server may use the examples to update the classifier, and then distribute the updated classifier code and/or updated classifier parameters to the user devices. The users of the devices may be incentivized to provide the examples that break the classifier, for example, by monetary reward, access to updated versions of the classifier, public ranking or recognition of the user, a self-rewarding game. The examples may be evaluated using a pipeline of untrained crowdsourcing providers and trained experts. The examples may contain user images and/or depersonalized information extracted from the user images.

18 Claims, 4 Drawing Sheets

DATA ACQUISITION FOR MACHINE PERCEPTION SYSTEMS

CROSS-REFERENCE TO RELATED APPLICATION

This application claims priority from U.S. provisional patent application Ser. No. 61/763,431, entitled ACTIVE DATA ACQUISITION FOR DEVELOPMENT AND CONTINUOUS IMPROVEMENT OF MACHINE PERCEPTION SYSTEMS, filed on Feb. 11, 2013. This application also is a continuation-in-part of, and claims priority from, U.S. patent application Ser. No. 14/177,174, entitled COLLECTION OF MACHINE LEARNING TRAINING DATA FOR EXPRESSION RECOGNITION, filed on Feb. 10, 2014, which claims priority from U.S. Provisional patent application Ser. No. 61/762,820, entitled SYSTEM FOR COLLECTING MACHINE LEARNING TRAINING DATA FOR FACIAL EXPRESSION RECOGNITION, filed on Feb. 8, 2013. Each of the above-referenced patent applications is hereby incorporated by reference in its entirety as if fully set forth herein, including text, figures, claims, tables, and computer program listing appendices (if present), and all other matter in the United States patent application.

FIELD OF THE INVENTION

This document relates generally to apparatus, methods, and articles of manufacture for data collection for machine learning, and the use of the data for iterated or continual improvement of machine perception systems. More specifically, this document relates to data collection for facial expression recognition machine training, and to expression classifiers/recognizers.

BACKGROUND

There are many existing and potential uses for automated facial expression recognition. Perhaps the best known use is the smile detection in digital cameras. There are others, including facial detection in response to various external stimuli, such as consumer reactions to advertisements, product displays, labeling, packaging, and pricing; voter reactions to talking points and evaluation of debate performances; and still other uses.

A need exists for improved methods and apparatus for automatically detecting and classifying facial expressions, including expressions responsive to external stimuli. One approach for developing such systems relies on machine learning techniques. Such techniques typically use large numbers of example images (which term herein indicates still images as well as videos) to discover the features that discriminate between different expression categories. A need also exists for efficient methods to generate and collect data that can be used for training automatic expression classifiers. The design of these data collection methods may be quite important for the success of the machine-learning expression classifiers that machine-learn using the collected data.

SUMMARY

Embodiments described in this document are directed to methods, apparatus, and articles of manufacture that may satisfy one or more of the above described and other needs.

In an embodiment, a user device is capable of capturing images. The device includes an expression classifier, a display, and a network interface. The device is configured to evaluate the captured image for a predetermined expression using the expression classifier, and to allow a user of the device to view on the display the captured image and to transmit over a network the captured image to an image vetting and machine learning system in response to identification by the user of a discrepancy between output of the expression classifier and appearance of the captured image.

In an embodiment, a system includes a plurality of user devices, each user device of the plurality of user devices being capable of capturing images. Each user device includes an expression classifier, a display, and a network interface. Each user device is configured to evaluate the captured image for a predetermined expression using the expression classifier, and to allow a user of said user device to view on the display the captured image and to transmit over a network the captured image to an image vetting and machine learning system in response to identification by the user of a discrepancy between output of the expression classifier and appearance of the captured image. The system also includes a data vetting server configured to vet the images received from the plurality of user devices for presence of bone fide errors, using a crowdsourcing pipeline, to select vetted images. The system further includes a machine learning server configured to adjust parameters of the expression classifier based on the vetted images, resulting in one or more adjusted parameters. The system additionally includes a parameter distribution server configured to distribute the one or more adjusted parameters to at least one of the user devices.

In an embodiment a user device includes a processor implementing an expression classifier, a display, a camera, and a network interface. The processor of the user device is configured to execute code to evaluate an image captured by the camera for presence of a predetermined expression using the expression classifier, and to allow a user of the user device to view on the display the image captured by the camera, and to transmit over a network at least one of (1) the image captured by the camera, and (2) depersonalized data derived from the image, to a computer system in response to identification by the user of a discrepancy between output of the expression classifier corresponding to the image captured by the camera and appearance of the image captured by the camera.

In an embodiment, a method for providing machine learning examples includes capturing an image with a camera of a computerized user device; evaluating the image captured by the camera for presence of a predetermined expression using an expression classifier of the predetermined expression; displaying to a user of the computerized user device the image captured by the camera; receiving from the user an indication of a first discrepancy between output of the expression classifier corresponding to the image captured by the camera and appearance of the image captured by the camera of the user device; and transmitting at least one of (1) the image captured by the camera, and (2) depersonalized data derived from the image captured by the camera, to a computer system over a network, the step of transmitting being performed in response to the identification by the user of the first discrepancy between the output of the expression classifier corresponding to the image captured by the camera and the appearance of the image captured by the camera. The steps of evaluating, displaying, receiving, and transmitting may be performed by the computerized user device.

In an embodiment, a computer-implemented method includes receiving at a computer system from a plurality of users of a first plurality of user devices a plurality of images, each user device of the first plurality of user devices comprising a classifier of expression of a predetermined emotion, affective state, or action unit; checking the images of the plurality of images with a computer system classifier of expression of the predetermined emotion, affective state, or action and discarding images that do not meet a predetermined standard applied to output of the computer system classifier, resulting in objectively qualified images that pass the predetermined standard; sending to a plurality of untrained providers requests to rate the objectively qualified images with respect to appearance of the predetermined emotion, affective state, or action unit in the objectively qualified images; receiving ratings of the plurality of untrained providers, in response to the requests; applying a first quality check to the images of the plurality of images rated by the plurality of untrained providers, the first quality check being based on the ratings of the plurality of untrained providers, the step of applying the first quality check resulting in a plurality of images that passed the first quality check; sending the plurality of images that passed the first quality check to one or more experts, for rating the images of the plurality of images that passed the first quality check by the one or more experts with respect to appearance of the predetermined emotion, affective state, or action unit in the images of the plurality of images that passed the first quality check; receiving ratings from the one or more experts, in response to the step of sending the plurality of images that passed the first quality check; applying a second quality check to the images rated by the one or more experts, the second quality check being based on the ratings of the one or more experts, the step of applying the second quality check resulting in one or more images that passed the second quality check; and at least one of (1) transmitting the one or more images that passed the second quality check to a distribution server, and (2) storing the one or more images that passed the second quality check.

These and other features and aspects of the present invention will be better understood with reference to the following description, drawings, and appended claims.

DETAILED DESCRIPTION

Figure 1:
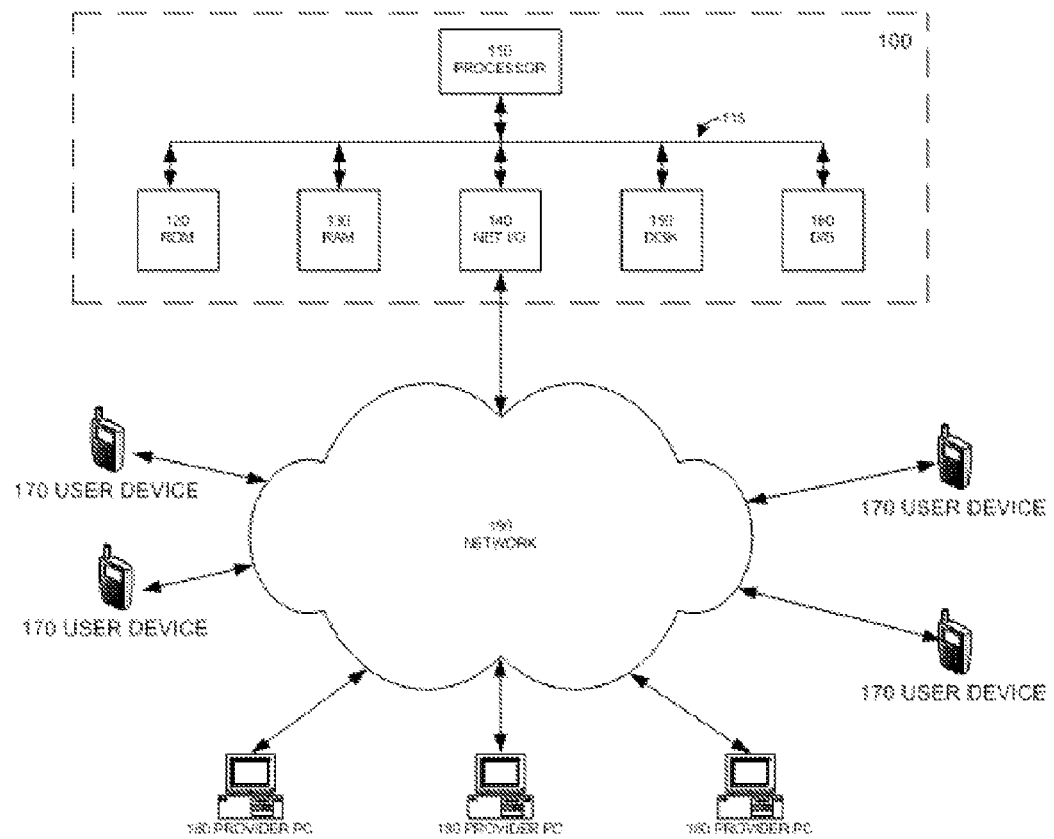
FIG. 1 is a simplified block diagram representation of a computer-based system configured in accordance with selected aspects of the present description.

In this document, the words "embodiment," "variant," "example," and similar expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar expressions and phrases may be used to indicate one of a number of different possible embodiments. The number of possible embodiments/variants/examples is not necessarily limited to two or any other quantity. Characterization of an item as "exemplary" means that the item is used as an example. Such characterization of an embodiment/variant/example does not necessarily mean that the embodiment/variant/example is a preferred one; the embodiment/variant/example may but need not be a currently preferred one. All embodiments/variants/examples are described for illustration purposes and are not necessarily strictly limiting.

The words "couple," "connect," and similar expressions with their inflectional morphemes do not necessarily import an immediate or direct connection, but include within their meaning connections through mediate elements.

"Affective" information associated with an image or video includes various types of psychological reactions, such as affective (as this term is generally understood), cognitive, physiological, and/or behavioral responses, including both recorded raw signals and their interpretations. Relevant information that represents or describes a particular person's reaction(s) toward a stimulus in terms of the person's affective, cognitive, physiological, or behavioral responses is referred to in the present description as affective information. The affective information can be attributable to psychological and physiological reactions such as memories, associations, and the like.

"Causing to be displayed" and analogous expressions refer to taking one or more actions that result in displaying. A computer or a mobile device (such as a smart phone or tablet), under control of program code, may cause to be displayed a picture and/or text, for example, to the user of the computer. Additionally, a server computer under control of program code may cause a web page or other information to be displayed by making the web page or other information available for access by a client computer or mobile device, over a network, such as the Internet, which web page the client computer or mobile device may then display to a user of the computer or the mobile device.

"Causing to be rendered" and analogous expressions refer to taking one or more actions that result in displaying and/or creating and emitting sounds. These expressions include within their meaning the expression "causing to be displayed," as defined above. Additionally, the expressions include within their meaning causing emission of sound.

References to "images" used as training data refer to still images, videos, and both still images and videos. A "picture" is a still image. "Video" refers to motion graphics.

"Facial expressions" as used in this document signifies the facial expressions of primary emotion (such as Anger, Contempt, Disgust, Fear, Happiness, Sadness, Surprise, Neutral); as well as expressions of affective state of interest (such as boredom, interest, engagement); and so-called "action units" (movements of a subset of facial muscles, including movement of individual muscles). The term "facial expressions" includes head poses and gestures.

"Mental state" as used in this document means emotion, affective state, or similar psychological state; "expression of emotion, affective state, and similar psychological state" means expression of emotion, affective state, or similar psychological state.

As used in this document, a classifier "breaks" or is "broken" when it makes a mistake in classifying a data sample. Thus, the classifier breaks when it detects a target emotion or affective state in an image that to people does not have the appearance of an expression of the target emotion or affective state. The classifier also breaks when it fails to detect the target emotion or affective state in image that has the appearance of an expression of the target emotion or affective state.

Other and further explicit and implicit definitions and clarifications of definitions may be found throughout this document.

Reference will be made in detail to several embodiments that are illustrated in the accompanying drawings. Same reference numerals are used in the drawings and the description to refer to the same apparatus elements and method steps. The drawings are in a simplified form, not to scale, and omit apparatus elements and method steps that can be added to the described systems and methods, while possibly including certain optional elements and steps.

It is, of course, desirable to automate expression recognition. Such automation reduces the costs of recognition, and also provides a measure of objectivity to the result of the recognition process. But automatic (machine) expression recognition is not a trivial design task; facial expressions are not easy to define using standard programming techniques. Machine learning is a collection of techniques that may be used for this purpose. Machine learning allows artificial intelligence systems to learn from examples, in effect performing self-adaptation based on the training data. These techniques typically require large and carefully collected datasets, for example, a large number of sample images of different people, in different illumination conditions, of various ethnicities and different ages, and with a range of facial artifacts. While it may be relatively easy to collect examples of posed smiles from the Web, it is difficult to collect a large number of examples of real or at least realistic expressions of emotions such as fear, contempt, anger, disgust, and others. It is still more difficult to obtain data that "breaks" an expression classifier (which can also be referred to as expression detector and expression recognizer, or simply classifier, detector, recognizer). It is, however, beneficial in machine learning training to focus on these particular data for which the detector makes mistakes.

In this document, we describe infrastructure (software and/or hardware) that facilitates the acquisition of errors and the incorporation of these errors into improved machine learning systems. In examples, data are collected by users based on the current expression classifier and these data are used as feedback for improving the expression classifier, thereby obtaining a new version of the expression classifier. The infrastructure integrates software (e.g., software applications running on a laptop, desktop, tablet, smartphone, still camera, video camera), hardware (e.g., laptop computers, desktop computers, servers, mobile devices with cameras and microphones, such as tablets and smartphones, still cameras, video cameras), social networking (e.g., keeping track of the different users and incentivizing them to send data). The infrastructure may also integrate crowdsourcing services; in particular examples, the identification of errors may use crowdsourcing, such as the Amazon Mechanical Turk.

The Amazon Mechanical Turk is a crowdsourcing Internet-based resource that enables "requesters" to manage the use of human intelligence for tasks that computers are not well equipped to perform at this time. The requesters are able to post tasks that "providers" or "Turkers" can perform for compensation set by the requesters. Note that the use of the terms "Turker," "requester," or "provider" and related terms does not necessarily signify Amazon's resource, but applies to any crowdsourcing resource.

FIG. 1 is a simplified block diagram representation of a computer-based system 100, configured in accordance with selected aspects of the present description to interact with users at user devices 170 (such as tablets, still and video cameras, smartphones, computers), and with crowdsourcing providers at provider machines 180 (such as personal computers or PCs, smartphones, tablets), through a communication network 190.

FIG. 1 does not show many hardware and software modules of the system 100, of the provider machines 180, or of the user devices 170, and omits several physical and logical connections. The system 100 may be implemented as a special purpose data processor, a general-purpose computer, a computer system, or a group of networked computers or computer systems configured to perform the steps of the methods described in this document. In some embodiments, the system 100 is built on a personal computer platform, such as a Wintel PC, a Linux computer, or a Mac computer. The personal computer may be a desktop or a notebook computer. The system 100 may function as a server computer. In some embodiments, the system 100 is implemented as a plurality of computers interconnected by a network, such as the network 190, or another network.

As shown in FIG. 1, the system 100 includes a processor 110, read only memory (ROM) module 120, random access memory (RAM) module 130, network interface 140, a mass storage device 150, and a database 160. These components are coupled together by a bus 115. In the illustrated embodiment, the processor 110 may be a microprocessor, and the mass storage device 150 may be a magnetic disk drive. The mass storage device 150 and each of the memory modules 120 and 130 are connected to the processor 110 to allow the processor 110 to write data into and read data from these storage and memory devices. The network interface 140 couples the processor 110 to the network 190, for example, the Internet. The nature of the network 190 and of the devices that may be interposed between the system 100 and the network 190 determine the kind of network interface 140 used in the system 100. In some embodiments, for example, the network interface 140 is an Ethernet interface that connects the system 100 to a local area network, which, in turn, connects to the Internet. The network 190 may, therefore, in fact include a collection of networks.

The database 160 may be used for organizing and storing data that may be needed or desired in performing the method steps described in this document. The database 160 may be a physically separate system coupled to the processor 110. In alternative embodiments, the processor 110 and the mass storage device 150 may be configured to perform the functions of the database 160.

The processor 110 may read and execute program code instructions stored in the ROM module 120, the RAM module 130, and/or the storage device 150. Under control of the program code, the processor 110 may configure the system 100 to perform the steps of the methods described or mentioned in this document. In addition to the ROM/RAM modules 120/130 and the storage device 150, the program code instructions may be stored in other machine-readable tangible storage media, such as additional hard drives, floppy diskettes, CD-ROMs, DVDs, Flash memories, and similar devices. The program code can also be transmitted over a transmission medium, for example, over electrical wiring or cabling, through optical fiber, wirelessly, or by any other form of physical transmission. The transmission can take place over a dedicated link between telecommunication devices, or through a wide area or a local area network, such as the Internet, an intranet, extranet, or any other kind of public or private network. The program code may also be downloaded into the system 100 through the network interface 140 or another network interface.

In variants, the system 100 may function as a crowdsourcing server that enables the provider at the machines 180 to perform the human intelligence tasks ("HITs") specified by the system 100. The descriptions of the tasks may be predetermined and stored in one of the storage devices of the system 100, or received by the system 100 from another device or person. Those skilled in the art should be familiar with the Amazon Web Services implementing the Amazon Mechanical Turk that performs similar functions.

The system 100 may store the information received from the provider machines 180 and from the user devices 170 in a database, which database may be implemented with the components of the system 100, and/or other components. The database storing the information from the provider machines and the user devices 170 may be the database 160.

The user devices 170 may include cameras with still and/or video capability; expression classifiers configured to recognize one or several different facial expressions; and network interfaces with capability that allows them to send information to and receive information from the system 100 or another type of server/system, through the network 190 and/or another network. The network interface of a user device 170 may be a cellular interface and/or a WiFi interface, and may allow the user of the device 170 to send images (which term includes videos) and other sensor information to a data collection server, which may be part of the system 100, one or more separate systems, or a combination of some functionality of the system 100 with one or more other systems. An application executing on the device 170 may allow the user of the device to select an option to depersonalize image data, for example, by invoking depersonalization algorithms to send the image data that maintains information about the expression of an image while erasing information about the identity of the person or persons in the image, and/or removing other information, such as Global Positioning System (GPS) data, from the image. Depersonalization may also or instead include extracting or abstracting some image features that are meaningful to an expression classifier, and omitting the image itself.

The described architecture may be configured to provide incentives to the users to send to the system 100 (or another system) images for which the current expression classifier makes a mistake in recognizing a given expression. Thus, the users may be given an incentive to send the images taken with the smile detector of the user device 170 in active state, but without smile(s) on the face(s) in the images; this kind of mistake is a false positive example, as compared to a false negative example where a classifier should recognize a particular expression, but does not recognize it. In other words, a mistake is an image that broke the expression classifier.

The incentives may take many forms, including one or more of the following non-exclusive examples: (1) monetary reward; (2) access to the latest version of the classifier; (3) public ranking or recognition of the user as a data scouter who has submitted or agreed to submit images, or depersonalized data of the images, that broke the classifier. The incentive may be provided in the form of a self-rewarding game.

Just because the user has judged a particular image to be a mistake does not mean that the image should be considered a mistake that broke the expression classifier; the user may, for example, occasionally classify a picture that in fact contains a smile as a mistake of a smile detector, whether by design or through the user's own error. Therefore, the images submitted by the users through the devices 170 may be vetted to eliminate such "false" mistakes. In the described architecture, this function may be performed by a data vetting server, which may be part of the system 100, one or more separate systems, or a combination of some functionality of the system 100 with one or more other systems.

The images or image data from the user devices may be automatically sent from a data collection server to the data vetting server, for vetting the images so as to discard or ignore those that do not correspond to the expression classifier errors. The data vetting may be performed using a classifier and a "pipeline" of untrained workers or providers possibly working via crowdsourcing services, and expert workers (e.g., experts on facial expressions). These approaches are described in (1) U.S. provisional patent application Ser. No. 61/762,820, entitled SYSTEM FOR COLLECTING MACHINE LEARNING TRAINING DATA FOR FACIAL EXPRESSION RECOGNITION, filed on Feb. 8, 2013; and (2) United States patent application tentatively entitled COLLECTION OF MACHINE LEARNING TRAINING DATA FOR EXPRESSION RECOGNITION, Ser No. 14/177,174, which should be filed before the filing date of the present application, and which claims priority from the provisional patent application Ser. No. 61/762,820. Each patent application described in this paragraph is hereby incorporated by reference in its entirety as if fully set forth herein, including text, figures, claims, tables, and computer program listing appendices (if present), and all other matter in the United States patent application.

The system 100 may be configured to provide incentives to the users (data scouters) as a function of the results of the vetting process, described in more detail below. For example, a user may get paid more (or otherwise receive greater compensation, such as longer period of free updates) as more untrained workers and experts agree that the user has sent an example for which the current system classifier makes a mistake.

If the vetting process confirms that a particular image or depersonalized data derived from the image "broke" the expression classifier (i.e., is a bona fide error of the current expression classifier), the image or the depersonalized data is sent to a machine learning server. The machine learning server may be part of the system 100, one or more separate systems, or a combination of some functionality of the system 100 with one or more other systems. The machine learning server uses machine learning algorithms to modify the parameters of the machine perception system in the expression classifier, such as synaptic weights of an artificial neural network. This may be done using standard algorithms, for example, boosting, maximum likelihood estimation, and/or Bayesian inference.

The new parameters may be sent to a parameter or code distribution server. The parameter distribution server may be part of the system 100, one or more separate systems, or a combination of some functionality of the system 100 with one or more other systems. It may be configured to keep track of the different versions of the classifier (e.g., the entire classifier code, portions of the classifier code, parameter versions), and to send automatically new versions of the code/parameters to the users who have qualified to receive updates of the classifier. The users may qualify, for example, merely by registering, by participating as data scouters who have submitted images that "broke" a classifier, simply by being recognized as users of a qualified user device 170, and/or in other ways.

Figure 2:
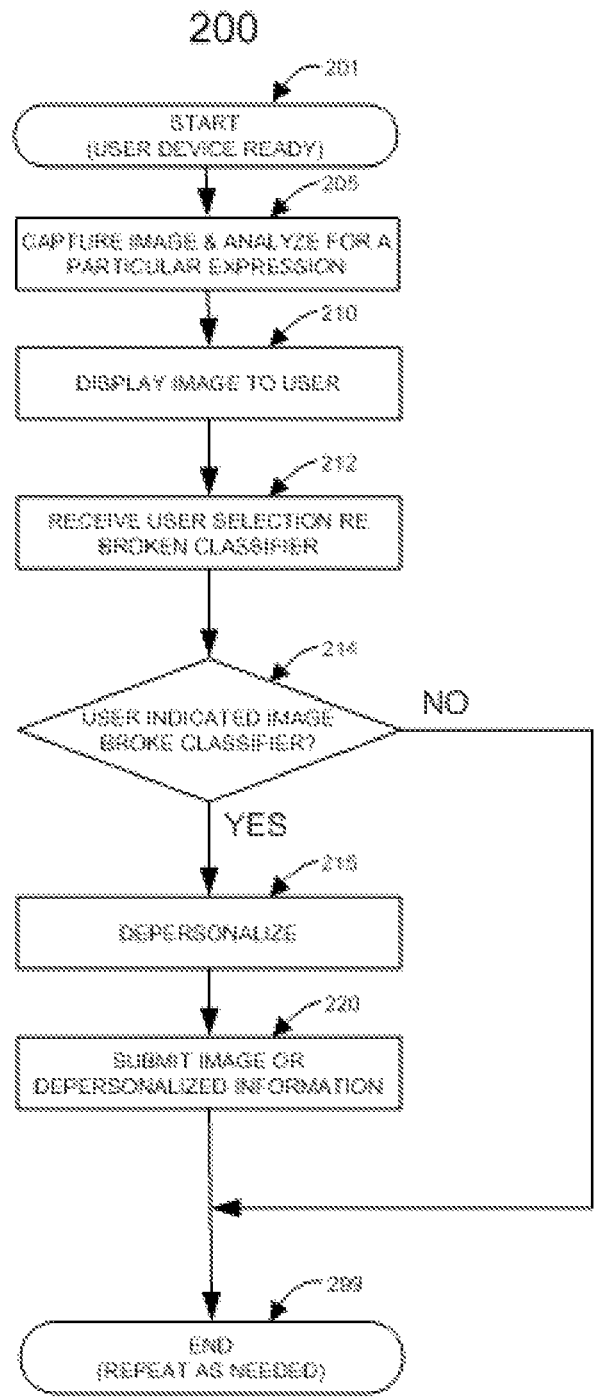
FIG. 2 illustrates selected steps of a process for obtaining and submitting an image that "breaks" an expression classifier.

FIG. 2 illustrates selected steps of a process 200 for obtaining and submitting an image that "breaks" the expression classifier at a user device 170.

At flow point 201 the user device 170 is powered up and available for obtaining images and analyzing the images with an expression classifier.

In step 205, an image is captured and analyzed for a particular expression, for example, a smile. The expression analysis may be performed after the image is captured; the expression analysis may be performed before the image is captured, as a precondition to capturing the image, as is common with smile detectors built into many cameras. The analysis may be carried out by a local expression classifier, such as one built into the user device 170. The analysis may also or instead be performed by an expression classifier executing on a remote server.

In step 210, the user device displays the image to the user. The user then decides whether or not the image is an error that broke the detector, and indicates the decision to the user device 170, for example, by pressing an appropriate button or making a corresponding selection from a menu. The user may decide that the facial expression in the captured image does not correspond to the target expression; for example, the user may decide that the captured image does not contain a smile, with the smile being the target expression. In step 212, the user device 170 receives the indication from the user.

In decision block 214, the user device 170 determines whether the user indicated that the image broke the classifier. If so, process flow continues to step 215; otherwise, process flow terminates at a flow point 299, to be repeated in whole or in part as needed.

Assuming that the user does decide that the image is an error and so indicates, in step 215, the depersonalization functionality of the user device 170 is invoked to depersonalizes the image data; note that this step may be performed automatically by the user device 170, or be invoked by the user through a predetermined input (e.g., hardware or software menu item), or based on some other criterion or criteria. In embodiments, this step is omitted.

In step 220, the user submits the image or the depersonalized data of the image to the data collection server. Again, this may be a simple invocation of a predetermined input (such as a button, dial, menu item) of the user device 170, causing the user device 170 to transmit the image or depersonalized data to the data collection server. In embodiments, the depersonalization and the submission are invoked with the same input.

The process 200 then terminates at the flow point 299, to be repeated in whole or in part as needed.

Figure 3:
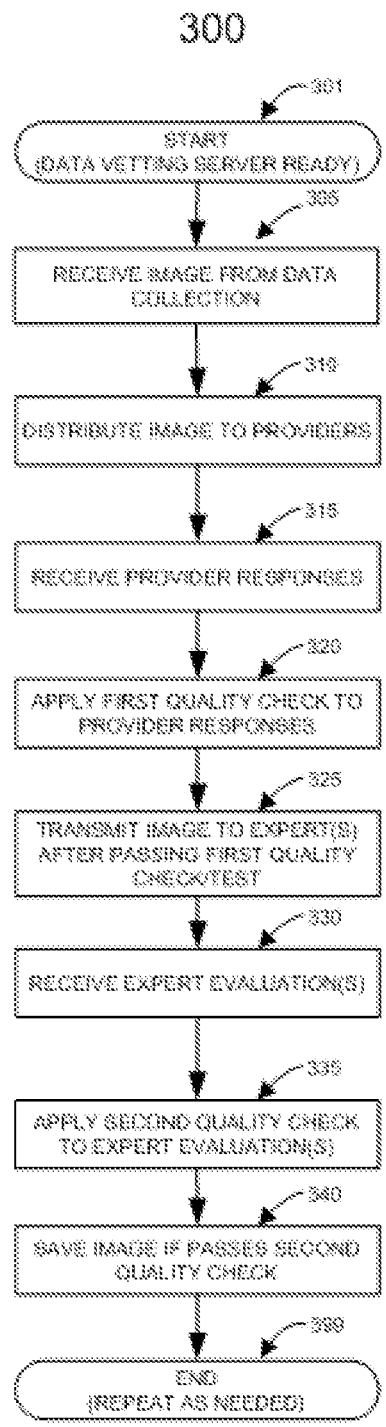
FIG. 3 illustrates selected steps of a process for vetting an image received from a user device.

FIG. 3 illustrates selected steps of a process 300 for vetting an image received from a user device.

At flow point 301 the data vetting server is powered up and configured for operation.

In step 305, the data vetting server receives the image from the data collection server, or otherwise obtains the image, for example, retrieving the image from storage of the server or receiving it from the user.

In step 310, the data vetting server distributes the image to providers. The providers also receive instructions/question(s) for evaluating the image, such as "Does this image show a person exhibiting emotion X? Yes or No"; "Rate the image as showing an emotion X on a scale of 1 to 10"; or "Is this a good example of emotion X? Answer by choosing one of the following: (1) Looks nothing like it, (2) Poor example, (3) OK, (4) Pretty good example, (5) Incredibly good." These are, of course, merely examples of the instructions/questions. The instructions/question(s) may be received together with the image, separately, be pre-stored on the provider device 180, or otherwise made available to the providers. Thus, the providers are asked to rate the image based on to a predetermined criteria/criterion applied to the image. Note that the providers need not be specially trained in facial expression recognition. The criteria/question may ask the providers to evaluate how well does the displayed expression matches a specific emotion, such as anger, contempt, disgust, fear, happiness, sadness, surprise, or another expression or affective state or a combination of one or more action units (such as action units of the Facial Action Coding System or "FACS"). The expression or affective state or action units may be the same one that the classifier of the user device 170 is configured to detect.

In step 315, the data vetting server receives responses from the providers, which responses were generated in response to the image sent to the providers in the previous step.

In step 320, the image is tested by applying a first predetermined quality criterion (or criteria) to the responses from the providers. The first quality criterion may be, for example, at least N of untrained providers agree that the expression is a bad expression of emotion X. The number N may be an absolute predetermined threshold number (five, for example), a scaled predetermined threshold number (N out of M, such as 6 out of 10), a predetermined threshold percentage (65%, for example). The percentages and numbers given here are exemplary and not necessarily limiting.

In some embodiments, the process terminates here, and if the image passes (meets the criterion or criteria and therefore passes the first quality test), it is added to the database of new training images accessible by the machine learning server; additionally, an incentive record of the user who provided the image may be created or updated, so that user may receive the appropriate incentive. In some other embodiments, the process continues to step 325, in which the image that passed the first quality test of the step 320 (but not or not necessarily an image that failed the first quality test of the step 320) is transmitted to be vetted by a one or more facial expression experts. For example, the image is electronically transmitted from the system 100, over the network 190 to be vetted by a pool of facial expression experts. An expert is generally trained in recognizing facial expressions, poses, gestures, and whose services, and the expert's services may consequently be more expensive than the services of the providers. In embodiments, only a single expert is used; in other embodiments, two, three, or more experts may be used. The expert(s) may be asked, for example, to rate the images on a pass/fail basis, or to select and assign a grade, from among three or more available grades, to the image, with respect to each particular type of expression. For example, the expert(s) may be asked to rate the smile in the image.

In step 330, the data vetting server receives the decisions/ratings of the experts regarding the image, and stores the decisions. For example, the system 100 may receive the expert decision(s)/rating(s) and store it/them in the database 160, or elsewhere.

In step 335, a second predetermined quality criterion (or criteria) is (or are) applied to the decision(s) of the one or more experts, to accept or reject the image. The second quality criterion may be set in a way that is analogous to the way the first predetermined quality criterion was set, for example, at least P experts agree that the expression matches that of an emotion X. The number P may be an absolute number, a scaled number, or a percentage. Where only a single expert is used, the expert may decide whether the image passé or fails this test. If the image passes the second predetermined quality criterion, it is accepted and added to the database of new training images accessible by the machine learning server, in step 340; additionally, an incentive record of the user who provided the image may be created or updated, so that user may receive the appropriate incentive, either immediately or in the future.

The process then terminates at flow point 399, and may be repeated as needed.

In variants of the process 300, the data vetting server includes a step of testing the image with a classifier; if the image does not break the classifier with which it is tested, the image may be discarded, for example, not sent to the providers in the step 310 or to the experts in the step 325.

Figure 4:
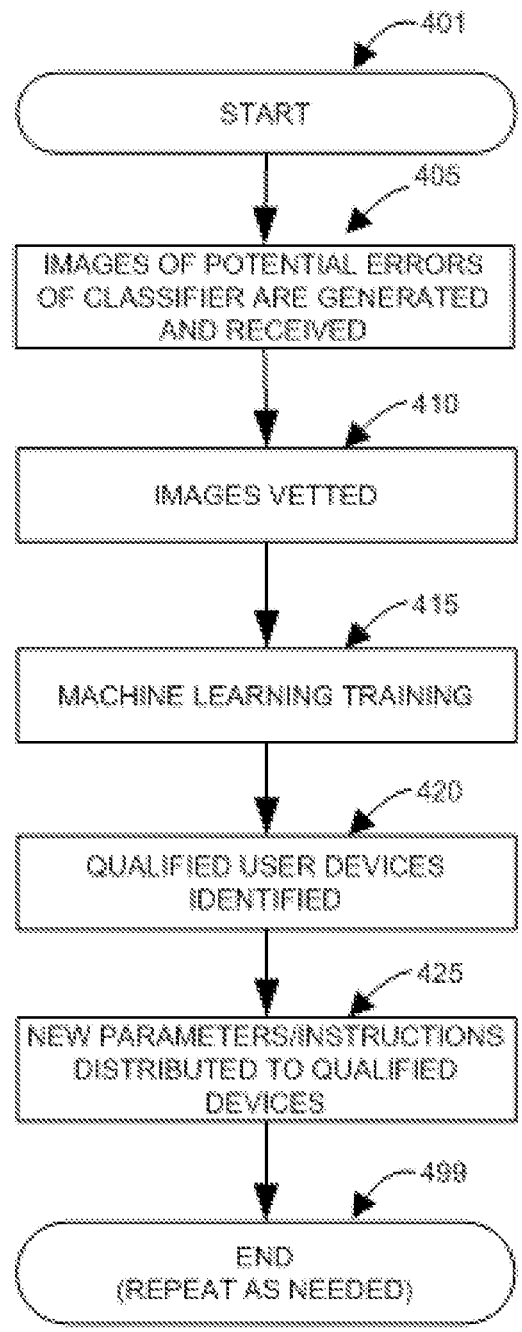
FIG. 4 illustrates selected steps of a process for data collection, vetting, machine learning, and parameter distribution.

FIG. 4 illustrates selected steps of a data collection, vetting, machine learning, and parameter distribution process 400, beginning at flow point 401 and ending at flow point 499.

In step 405, the images that potentially correspond to "errors" of an expression classifier are generated and received by the system performing the process 400. This is described in more detail in relation to the data collection of FIG. 2.

In step 410, the images are vetted. This is described in more detail in relation to the data vetting of FIG. 3.

In step 415, an expression classifier is trained using the vetted images as training data. This step may result in one or more new parameters for the expression classifier, new code (in whole or in part) for the expression classifier, or in an otherwise changed expression classifier.

In step 420, one or more user devices that qualify for the distribution of the new expression classifier are identified. As described above, this may (but not necessarily does) depend on the participation in the data scouting by the users of these devices. (Data scouting refers to agreement to provide, or previous provision of, images that broke the classifier, or depersonalized information extracted or abstracted from such images.)

In step 425, the new parameters or code (instructions) of the changed classifier are distributed to the qualified devices, for example, through the network 190.

At flow point 499, the process ends, and may be to be repeated as needed.

The system and process features described throughout this document may be present individually, or in any combination or permutation, except where presence or absence of specific feature(s)/element(s)/limitation(s) is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other forms of non-transitory storage medium known in the art, whether volatile or non-volatile. Exemplary storage medium or media may be coupled to one or more processors so that the one or more processors can read information from, and write information to, the storage medium or media. In an alternative, the storage medium or media may be integral to one or more processors.

This document describes in considerable detail the inventive apparatus, methods, and articles of manufacture for obtaining and using training data for machine learning systems. This was done for illustration purposes. The specific embodiments or their features do not necessarily limit the general principles underlying the invention. The specific features described herein may be used in some embodiments, but not in others, without departure from the spirit and scope of the invention as set forth herein. Various physical arrangements of components and various step sequences also fall within the intended scope of the invention. Many additional modifications are intended in the foregoing disclosure, and it will be appreciated by those of ordinary skill in the pertinent art that in some instances some features will be employed in the absence of a corresponding use of other features. The illustrative examples therefore do not necessarily define the metes and bounds of the invention and the legal protection afforded the invention, which function is carried out by the claims and their equivalents.

What is claimed is:

1. A device, comprising:
   a processor implementing an expression classifier
   wherein the processor is configured to execute code to:
      receive image data for an image captured by a camera;
      receive a perceived expression of the image,
      receive an output of an expression classifier corresponding to the image captured by the camera, wherein the output comprises a predetermined expression that is different than the perceived expression,
      provide the image data to a plurality of remote devices with a request for review of the perceived expression of the image.

2. The device of claim 1, wherein the expression classifier is a smile recognizer.

3. The device of claim 1, wherein the device is a smartphone.

4. The device of claim 1, wherein the device is a mobile tablet.

5. The device of claim 1, wherein the device is a computer.

6. The device of claim 1, wherein the device is a mobile device.

7. The device of claim 1, wherein the processor is further configured to depersonalize the image to obtain the depersonalized data, and to prevent transmitting the image to the computer system.

8. A method for providing machine learning examples, the method comprising:

receiving image data for an image captured by a camera of a computerized device;

receiving an indication of a first discrepancy between output of an expression classifier corresponding to the image captured by the camera and a perceived expression of the image captured by the camera of the device; and transmitting, to a plurality of remote devices, image data for the image captured by the camera with a request for review of the perceived expression of the image.

9. The method of claim 8, further comprising:

generating at least one of updated code and one or more updated parameters for the expression classifier, the at least one of the updated code and the one or more updated parameters being derived from one or more machine learning examples identified by one or more discrepancies between perceived expressions of the machine learning examples and corresponding outputs of the expression classifier; and updating the expression classifier with the at least one of the updated code and the one or more updated parameters to obtain an updated machine learning classifier.

10. The method of claim 9, further comprising:

distributing a reward based on the received indication of the first discrepancy.

11. The method of claim 10, wherein the one or more discrepancies comprise the first discrepancy.

12. The method of claim 8, wherein the image is not transmitted to the computer system, the method further comprising:

depersonalizing the image to obtain the depersonalized data.

13. A non-transitory computer readable medium comprising computer readable code which, when executed by a processor implementing an expression classifier, causes the processor to:

receive image data for an image captured by a camera;

receive a perceived expression of the image, receive an output of an expression classifier corresponding to the image captured by the camera, wherein the output comprises a predetermined expression that is different than the perceived expression, provide the image data to a plurality of remote devices with a request for review of the perceived expression of the image.

14. The non-transitory computer readable medium of claim 13, wherein the classifier is a smile recognizer.

15. The non-transitory computer readable medium of claim 13, wherein the camera is comprised in a smartphone.

16. The non-transitory computer readable medium of claim 13, wherein the camera is comprised in a mobile tablet.

17. The non-transitory computer readable medium of claim 13, wherein the camera is comprised in a computer.

18. The non-transitory computer readable medium of claim 13, wherein the camera is comprised in a mobile device.

\* \* \* \* \*